March 28, 1961  H. L. BENNETT ET AL  2,976,681
CLAM SHELL THRUST REVERSERS WITH NOISE SUPPRESSORS
Filed Sept. 17, 1957  2 Sheets-Sheet 1

INVENTORS.
HAROLD L. BENNETT
BYRON K. BOHM
WENDELL H. PEARSON
BY
Reynolds, Beach & Christensen
ATTORNEYS March 28, 1961   H. L. BENNETT ET AL   2,976,681
CLAM SHELL THRUST REVERSERS WITH NOISE SUPPRESSORS
Filed Sept. 17, 1957   2 Sheets-Sheet 2

INVENTORS.
HAROLD L. BENNETT
BYRON K. BOHM
WENDELL H. PEARSON
BY Reynolds, Beach & Christensen
ATTORNEYS

United States Patent Office 2,976,681
Patented Mar. 28, 1961

2,976,681
CLAM SHELL THRUST REVERSERS WITH NOISE SUPPRESSORS

Harold L. Bennett, Byron K. Bohm, and Wendell H. Pearson, Seattle, Wash., assignors to Boeing Airplane Company, Seattle, Wash., a corporation of Delaware Filed Sept. 17, 1957, Ser. No. 684,488

2 Claims. (Cl. 60—35.54)

The present invention aims to provide a noise suppressor for use with a jet engine operating to propel an aircraft or similar vehicle, which is efficient both as to the suppression of noise and as to minimum interference with forward thrust, and to combine with the same in a simple manner a thrust reverser which can be used after touchdown of the airplane to decelerate the same.

There have been various proposals to accomplish the general end indicated above. The present invention provides a complete and unitary noise suppressor for application to the tail end of a jet engine housing, which noise suppressor can be shifted bodily in the axial direction to form a gap for lateral and forward escape of diverted gases, together with a thrust reverser means complete in itself and retained normally in an inactive position, wherein the thrust reverser means cooperates with the housing ahead and the noise suppressor behind to form a streamline exterior contour, but is movable into intercepting position when the gap is opened to divert the gases outwardly and forwardly.

The noise suppressor may be any of various shapes, contours, or designs. It may be, for instance, of the known tubed or "organ pipe" variety, involving a series of rearwardly directed separate pipes or tubes, or it may be of lobar shape. The lobar shape is illustrated, but as has just been indicated, the particular nature of the noise suppressor is not material in the formation of the device of this invention as a whole.

Figure 1:
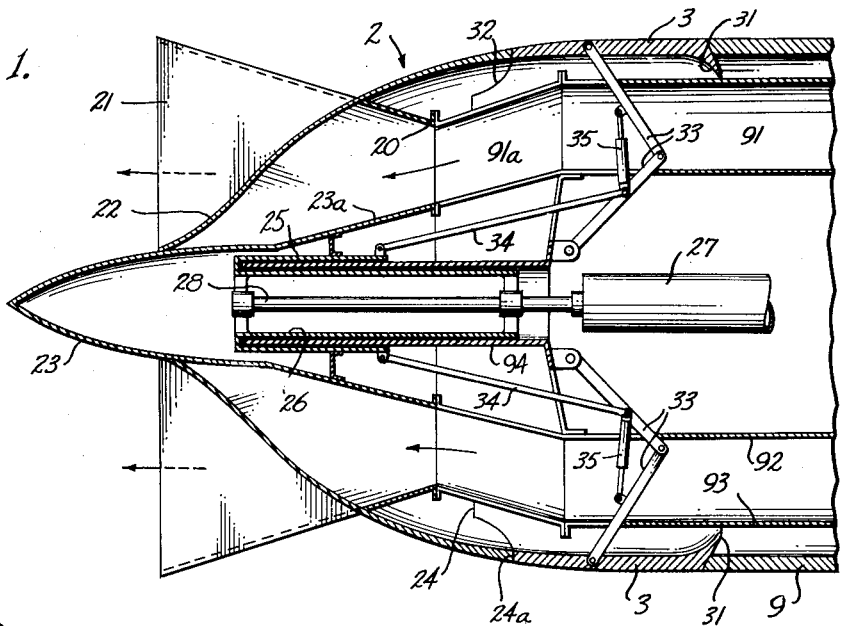
Figure 1 is a horizontal axial sectional view through the rear end of such a jet engine and the noise suppressor and thrust reverser mechanism, showing parts in the normal or "cruise" position.

The exterior housing 9 of a jet engine is elongated and substantially annular in shape, with its axis directed forwardly and rearwardly. The same is suitably supported from the airplane (not shown), as for instance, by a strut 90. Interiorly, it is formed to define an annular, forwardly and rearwardly directed gas duct 91, and to this end an axially disposed island 92 may be suitably supported within and axially of the housing 9. There may be also an inner liner 93 within and spaced from the outer shell 9 of the housing.

The gas duct 91 is preferably directed annularly inwardly at its rear end as indicated by the portion designated 91a, and while this might be considered as the jet nozzle, it is not ordinarily so considered, since the jet nozzle proper in this design is a separate unit in the form of the noise suppressor, bodily movable as a unit in the axial direction with respect to the housing 9.

Such a nozzle is indicated in general by the numeral 2. As has been indicated, it may assume any of various suitable forms or designs, and that shown includes the radiating lobes 21 distributed about the axis and separated by valleys 22, whereby the relative air by following the external shape of the housing 9 and of the valleys 22 has access to the spaces between the lobes 21. In this way, or in any other suitable manner, the divided jets issuing from the individual lobes 21 or equivalent are more or less surrounded and separated by the air moving through the valleys 22, and in this manner, according to known principles, the objectionable noise of the issuing jet or jets is suppressed to a large extent.

Figure 3:
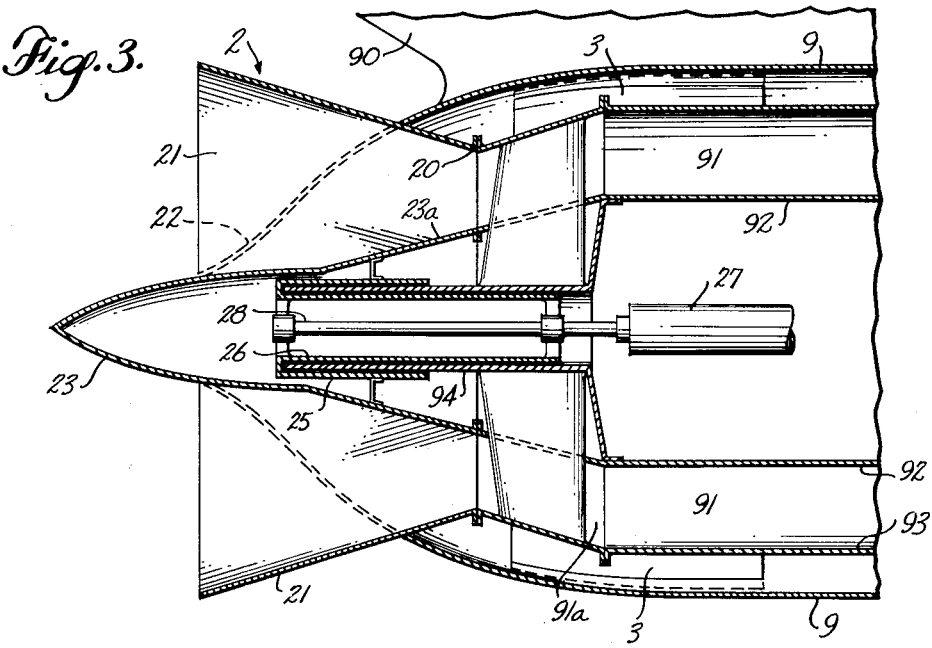
Figure 3 is a vertical axial sectional view with parts in the position corresponding to Figure 1.
Figure 4:
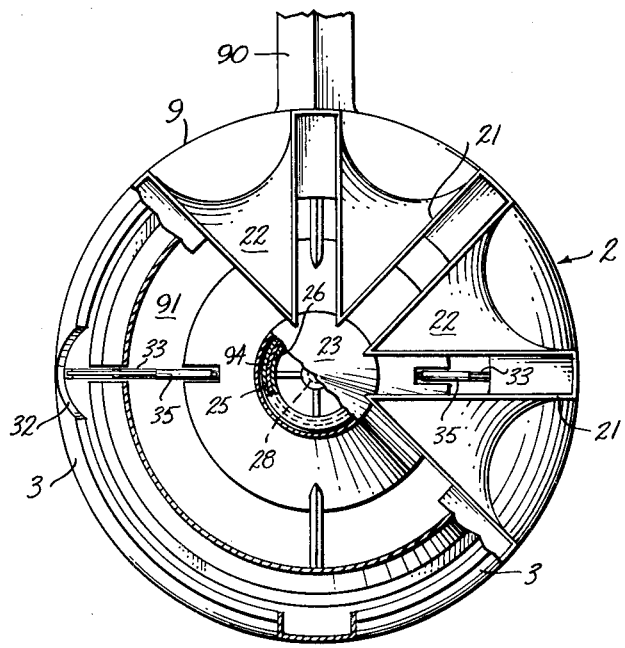
Figure 4 is a rear end elevation, partly broken away, of the engine and the noise suppressor and thrust reverser mechanism, with parts in the positions corresponding to Figures 1 and 3.

In the "cruise" position of the parts shown in Figures 1 and 3, it will be observed that the forward end 20 of the lobes meets and matches with the rear end of the outer wall of the duct 91a, and a tailcone 23 with its forward extension 23a meets and matches the inner wall of the same passage 91a. The interiors of the lobes therefore form a smooth continuation of the gas duct and the gases issue in a number of separated lobar nozzles.

In similar fashion, the forward end 24 of the exterior of the nozzle assembly forms a smooth continuation of the skin immediately ahead of it, but this skin is preferably not a part of the housing 9, but rather for the most part is formed by thrust reverser "clam shells" or vanes 3, which will now be described.

Figure 2:
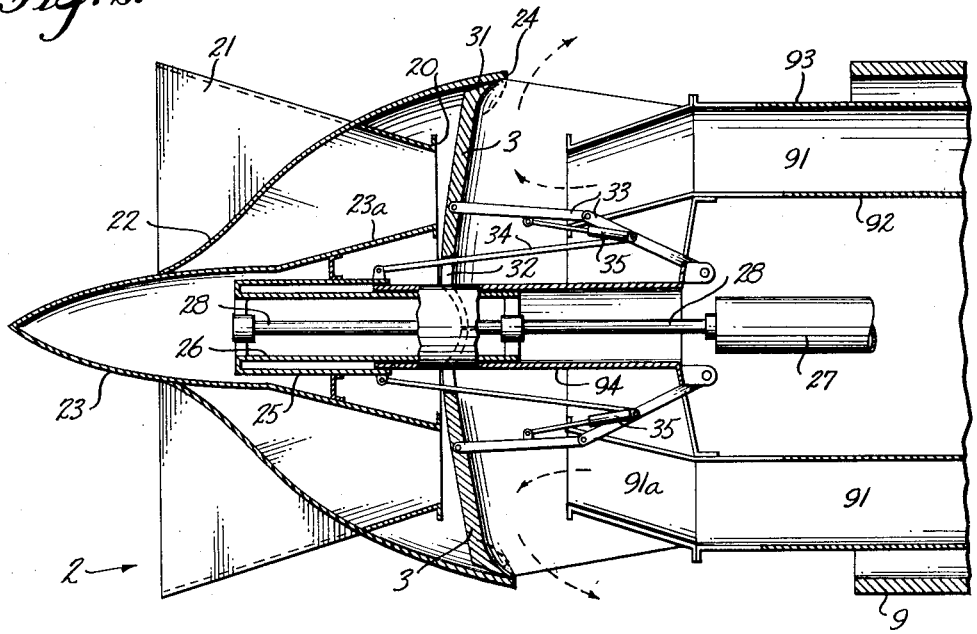
Figure 2 is a view similar to Figure 1, but showing parts in the thrust-reversing position.

These clam shells are generally substantially semi-annular in shape, supported for movement resembling a pivotal movement about their ends, and so formed as to fit, when retracted or inactive, intermediate the rear end of the exterior housing 9 and the forward end 24 of the noise suppressor assembly. This position of parts is best shown in Figure 1. In their active position, however, the thrust reverser clam shells 3 are drawn inwardly and directed transversely of the gases issuing from the annular passage 91a, somewhat to the rear of that exit, wherefore the thrust reverser elements 3 direct these issuing gases generally outwardly and somewhat forwardly. Baffles 31 are provided at their forward or outer ends to assist in thus directing the exiting gases. The gases exit through the gap left by the inward movement of the thrust reverser vanes into their operative or active position, that of Figure 2, and by the rearward bodily movement of the noise suppressor assembly which is effected prior to the inward movement of the thrust reverser vanes, in order to permit movement of the latter.

The island 92 preferably is formed with a reduced rearward extension within and extending rearwardly of the duct 91a, and this extension is shown at 94. It is this extension which supports the noise suppressor assembly for its rearward movement, a sleeve 25, constituting a part of the noise suppressor, being guided for axial sliding movement upon the extension 94 of the island. The clam shells 3 must straddle the extension 94 when in their thrust-reversing position. Consequently, these vanes 3 are notched, as indicated at 32, to this end, and the forward end 24 of the exterior of the noise suppressor assembly is formed with a projection 24a which when the parts are in the "cruise" position fills the notch 32 to complete the streamline contour of the exterior of the complete assembly.

Support and movement of the several parts is accomplished in any suitable way, and that shown is merely intended to suggest a possible manner of support and movement. The noise suppressor assembly is guided by the sliding of a tube 26 within the extension 94 of the island, and its movement is effected by an actuator 27 operating through a rod 28. Since the movement of the thrust reverser vanes occurs conjointly with but never until immediately after the rearward movement of the noise suppressor, the same actuator may be employed, alone or in conjunction with other actuators, to effect corresponding movement of the clam shell elements or thrust reverser vanes. Thus, the thrust reverser vanes 3 may be supported upon pairs of toggle links 33, the movement of which may be effected by means of a tension link 34 connected to the sleeve 25 that moves with the noise suppressor vanes. Struts 35, which may be in the nature of spring cartridges or fluid pressure actuators, span the common pivot of the toggle links 33 and aid in the control and movement of the latter.

With parts in the cruise position of Figure 1, the clam shell elements 3 constitute a part of the smooth streamline contour of the housing, and a transitional element between the latter and the noise suppressor assembly. In this position the thrust reverser vanes 3 are completely inactive, except as they guide the ambient airflow rearwardly, and the noise suppressor assembly joins smoothly at the rear end of the gas duct 91a. When thrust reversal is required, the actuator 27 is energized to move the noise suppressor assembly 2 bodily rearwardly, opening a gap between its forward end and the housing, and causing inward movement of the thrust reverser vanes 3 into a position transversely across the path of the gases exiting from 91a. In this position, shown in Figure 2, the thrust reverser vanes 3 direct the gases outwardly and somewhat forwardly and block any movement of the gases leaving the passage 91a rearwardly through the noise suppressor assembly 2, as they usually do. All the gases are directed instead through the gap left by the rearward movement of the noise suppressor assembly 2 and by the inward movement of the thrust reverser vanes 3. When thrust reversal is no longer needed, opposite movement caused by the actuator 27 will return the thrust reverser vanes 3 to their inactive position, and will move the noise suppressor bodily forwardly into its normal position, and parts will then be restored to the position of Figures 1 and 3.

We claim as our invention:

1. In a jet engine for propulsion of an aircraft or the like, a composite exterior housing including a generally annular main portion, a rear terminal element spaced in all its positions rearwardly of said main portion, and generally semi-annular elements disposed intermediate the housing and the terminal element, and shaped to close the gap between the two other parts when all are in their normal positions, and all complementally shaped externally to constitute a streamlined whole, said housing enclosing an annular duct terminating at the terminal element, and the latter having a communicating jet nozzle, for normal rearward exit of combustion gases, a tailcone fixed with relation to the terminal element, an axially disposed supporting tube fixed with relation to the housing and telescopingly interconnected with the tailcone to support and guide the latter and the terminal element for bodily rearward movement relative to the housing from the normal position to a rearward position wherein the gap between the housing and the terminal element is increased, means supporting and guiding said intermediate elements from the housing for pivotal movement inwardly from their normal position into a blocking position within the gap, straddling the tailcone, spaced to the rear of and disposed transversely of said duct, and actuator means for moving the intermediate elements and the terminal element between their respective positions.

2. In a jet engine for propulsion of an aircraft or the like, a composite exterior housing including a generally annular main portion, a rear terminal element spaced in all its positions rearwardly of said main portion, and generally semi-annular intermediate elements shaped to close the gap between the other two parts when all are in their normal positions, all said housing parts enclosing an axially directed island fixed to the main portion of the housing and a tailcone fixed to the terminal element and constituting a rear terminus of the island, when parts are in their normal positions, said island being spaced inwardly from the main portion of the housing to define an annular gas duct, and the terminal element and the tailcone being complementally shaped to define a plurality of separate jet nozzles communicating with said gas duct when parts are in their normal positions, for rearward discharge of the combustion gases, means mounting the semi-annular intermediate elements for pivotal movement inwardly and rearwardly of their normal positions into blocking positions, within the gap and spaced behind the gas duct, each being notched to straddle the island when in blocking position, and actuator means to move said intermediate elements between their normal and blocking positions, respectively.

References Cited in the file of this patent

UNITED STATES PATENTS

| | | |
|---|---|---|
| 2,557,435 | Imbert | June 19, 1951 |
| 2,570,629 | Anxionnaz et al. | Oct. 9, 1951 |
| 2,681,548 | Kappus | June 22, 1954 |
| 2,715,312 | Brame | Aug. 16, 1955 |
| 2,793,494 | Kadosch et al. | May 28, 1957 |
| 2,839,891 | Drakeley | June 24, 1958 |
| 2,841,954 | Rainbow | July 8, 1958 |
| 2,847,823 | Brewer | Aug. 19, 1958 |

FOREIGN PATENTS

| | | |
|---|---|---|
| 860,754 | Germany | Dec. 22, 1952 |
| 744,196 | Great Britain | Feb. 1, 1956 |
| 745,649 | Great Britain | Feb. 29, 1956 |
| 764,907 | Great Britain | Jan. 2, 1957 |

OTHER REFERENCES

Withington: Aviation Age Magazine, vol. 25, No. 4, April 1956, pages 48–53, "Jet Noise Can Be Cut."